United States Patent Office 3,418,168
Patented Dec. 24, 1968

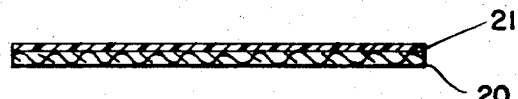
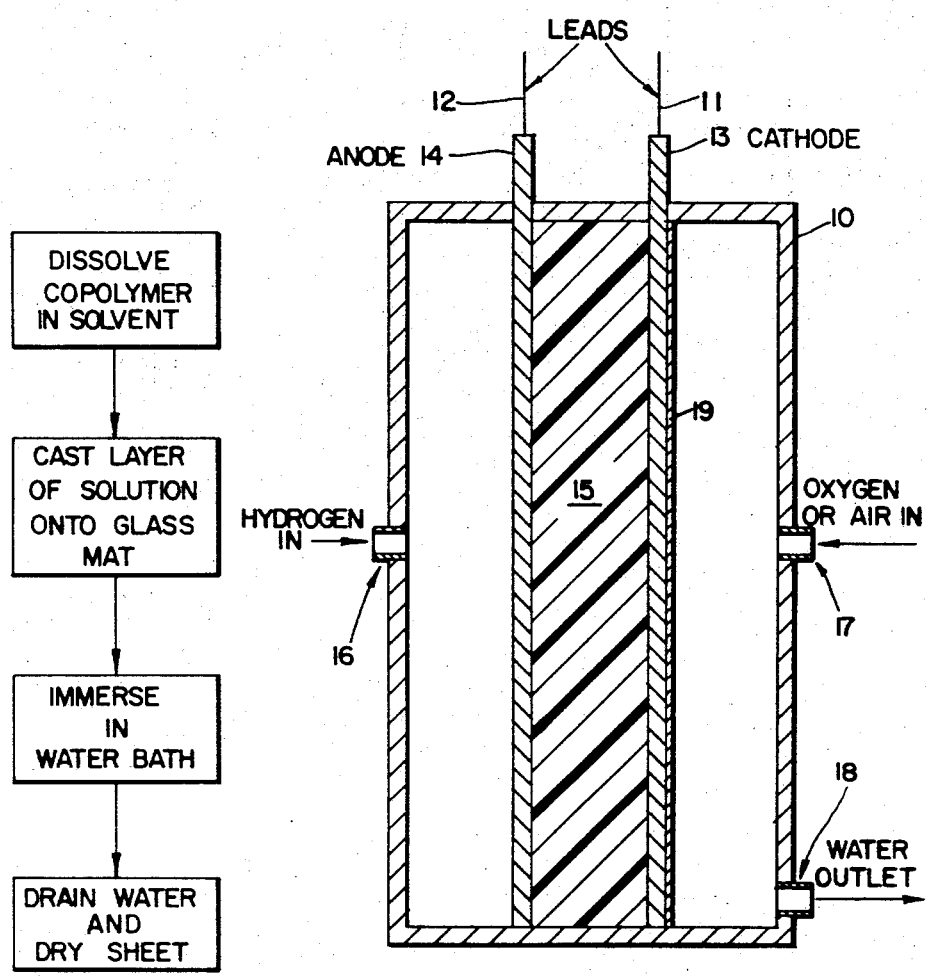

3,418,168
FUEL CELL WITH WATER REMOVING MEANS AT CATHODE
Ralph L. Wentworth, Watertown, Mass., assignor to W. R. Grace & Co., Cambridge, Mass., a corporation of Connecticut
Filed Dec. 7, 1964, Ser. No. 416,370
5 Claims. (Cl. 136—86)

ABSTRACT OF THE DISCLOSURE

A microporous sheet for use as a wick in fuel cells is composed of a hydrophilic filler and a vinyl chloride/acrylonitrile copolymer.

---

This invention relates to a novel microporous, permeable polymeric sheet and to the method of making such a sheet.

One object of this invention is to provide a novel permeable, microporous sheet comprising vinyl chloride/acrylonitirile copolymer.

Another object of this invention is to provide a permeable sheet comprising vinyl chloride/acrylonitrile copolymer for use as a wick in the removal of water from fuel cells.

Another object of this invention is to provide a novel permeable microporous battery separator for lead-acid batteries comprising a film of vinyl chloride/acrylonitrile copolymer.

Still another object of this invention is to provide a novel method for preparing novel permeable, microporous sheets of vinyl chloride/acrylonitrile copolymer.

These and other objects will be apparent from the discussion below.

FIGURE 1 is a cross-sectional view of the microporous sheet of the present invention;

FIGURE 2 is a flow diagram illustrating one embodiment of the novel process of the present invention; and FIGURE 3 is a cross-sectional view of a fuel cell showing the utilization therein of the microporous sheet of the present invention.

The novel microporous, permeable sheet of the present invention comprises a film of vinyl chloride/acrylonitrile copolymer having incorporated therein a hydrolic filler. The novel sheets of the present invention possess a random pore structure and allow the penetration of liquid, such as water or acid, into said pores with the subsequent passage through the entire thickness of the sheet. The sheet is capable of containing in the pore structure relatively large amounts of water. In one embodiment, for example, the sheet is capable of absorbing about 300 percent of its weight of water. The pore structure, water-permeability, and water absorption properties make such sheets particularly suitable for uses such as battery separators for lead-acid batteries and for water wicks for fuel cells.

The novel sheets may be prepared by dissolving vinyl chloride/acrylonitrile copolymer in a suitable solvent, incorporating the filler into said solution, casting a layer of said solution on a substrate and then extracting the solvent with water to coagulate the polymer to provide a continuous copolymer film with the filler imbedded therein. The film may then be removed from the substrate if an unsupported film is desired. Alternatively, the polymer-filler solution may be allowed to remain bonded to the substrate in order to provide dimensional stability and structural support to the film. The film layer may be formed on one or both surfaces of a support, e.g., a layer of solution may be cast on a smooth surface, the substrate laid thereon, and a second layer of solution poured onto the top surface of the substrate. Both layers of solution are then coagulated by immersion in water.

The ratio of vinyl chloride to acrylonitrile in the copolymer is not critical. Generally, not less than about 15 percent by weight acrylonitrile is used in the copolymer in order to prevent the film from becoming too brittle. If more than 50 percent acrylonitrile is used, the stability of the polymer is impaired. The preferred range is, therefore, 15 to 50 percent by weight acrylonitrile and 85 to 50 percent vinyl chloride. A particularly preferred weight ratio of vinyl chloride to acrylonitrile is 60:40. Suitable vinyl chloride/acrylonitrile copolymers are commercially available under the trade name Dynel (trade name of Union Carbide Corporation).

The solvent used in dissolving the polymer must be one which is miscible with water in order to provide a system wherein the polymer can be coagulated in water as a continuous film and the solvent can be readily removed by the water when the cast layer of polymer solution is contacted with water. As examples of suitable solvents, mention may be made of the formamides and ketones as, for example, dimethyl formamide, acetone, and methyl ethyl ketone. It should be noted that the above-described water coagulation procedure provides a continuous film which cannot be obtained by removal of the solvent by, for example, heat or vacuum. The amount of solvent used is not critical, provided that at least sufficient solvent is present to dissolve the copolymer.

The aforementioned water coagulation procedure for preparing the films also introduces the desired porosity into the sheet by the expansion of the filler when wet by the water and the subsequent shrinkage after the removal of the water. The hydrophilic nature of the filler also contributes to the absorption and retention of water by the novel microporous sheet of the present invention.

The filler should possess the property of being hydrophilic or possess the ability to be rendered hydrophilic in the film. Fillers suitable for use in the present invention should possess the particle size necessary to provide the desired porosity. Suitable fillers comprise silica gel (hydrated amorphous silica gel, e.g., Hi-Sil 233 — trade name of Columbia Southern Chemical Company, or aerogel, e.g., Syloid 244, trade name of W. R. Grace & Co.,) carbon black, and diatomaceous earth, as well as other hydrophilic fillers known to the art. Such fillers may be used either alone or in combination with another filler. When fillers such as diatomaceous earth or carbon black are used, a suitable wetting agent such as sodium dioctyl sulfosuccinate is used in conjunction with the filler in order to enhance the hydrophilic properties. Other wetting agents which are known and commonly used in the battery separator art are also suitable. Since the polymeric sheet is water-coagulable, it is desirable to use a filler that does not contain a predominant amount of water. The filler is used in the range of about 0.15 to 1.5 parts by weight per part of copolymer. Preferably, 0.66 part by weight of filler per part of copolymer is used.

Referring now to the drawings, FIGURE 1 is a cross-sectional view of one embodiment of the invention comprising a layer 21 of vinyl chloride/acrylonitrile copolymer with a filler incorporated therein on a fibrous glass mat 20. FIGURE 2 is a flow diagram illustrating one embodiment of the novel process of the present invention. FIGURE 3 will be discussed in more detail below.

The following nonlimiting examples illustrate the novel process and compositions of the present invention.

EXAMPLE 1

1.5 parts by weight of 60:40 vinyl chloride/acrylonitrile copolymer (Dynel) was dissolved in 15 parts of dimethyl formamide. 1 part by weight of silica areogel (Syloid 244, W. R. Grace & Co.) was incorporated into the thus-formed solution. The solution was then poured onto a smooth glass surface. A fibrous glass mat was laid onto the solution and a second layer of polymer solution was cast on top of the mat. The solution and mat on the glass surface were then immersed in a water bath and the polymer coagulated into a continuous film and the dimethyl formamide was flushed away with the water. The film was then dried to remove any residual water. The combined polymer film and mat was 20 to 30 mils in thickness. The film was found to be capable of absorbing 300 percent of its own weight of water.

EXAMPLE 2

The procedure of Example 1 was repeated except that the ratio of materials was 3 parts of copolymer, 45 parts of dimethyl formamide, and 0.5 part of silica aerogel.

EXAMPLE 3

The procedure of Example 1 was repeated except that the ratio of materials was 1 part of copolymer, 15 parts of dimethyl formamide, and 0.3 part of silica aerogel.

EXAMPLE 4

The procedure of Example 1 was repeated except that the ratio of materials was 1 part of the copolymer, 15 parts of dimethyl formamide, and 1.3 parts silica areogel.

The microporous sheets of Examples 2, 3, and 4 also possessed the ability to contain in the pores a relatively large quantity of water.

The novel permeable, microporous sheet of the present invention is particularly useful as a wick or membrane for the removal of water from gaseous fuel cells.

The hydrogen-oxygen fuel cell comprises a solid electrolyte ion exchange membrane which is nonpermeable to the hydrogen and the oxygen molecules and which keeps the two gases separated. Each surface of the membrane is coated with a catalyst which forms the electrodes. The exchange membrane is permeable to hydrogen ion flow. The following are the reactions of the fuel cell:

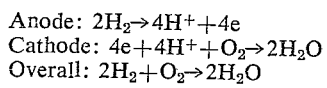

Anode: $2H_2 \rightarrow 4H^+ + 4e$
Cathode: $4e + 4H^+ + O_2 \rightarrow 2H_2O$
Overall: $2H_2 + O_2 \rightarrow 2H_2O$ The product of the overall cell reaction is water. This water accumulates on the edge of the cathode. It is desirable, therefore, to provide some means for collecting the water as it is formed and carrying it away from the cell. Unless the water is removed from the cathode, the action of the fuel cell will be retarded.

By contacting the cathode with the novel microporous permeable sheet of the present invention, the water formed on the cathode will be readily absorbed and carried away by said sheet from the cathode thereby permitting full operating efficiency of the fuel cell. The nonconductivity, as well as the microporous structure which permits the absorption of large quantities of water, makes the above-described microporous sheet an efficient wick for fuel cells.

Referring now to FIGURE 3, the utilization of the novel microporous sheet in a fuel cell will become clearer. The fuel cell comprises a container 10 enclosing an anode 14 and a cathode 13 separated by and in contact with ion exchange membrane 15. Leads 11 and 12 from the electrodes are connected to a load. Hydrogen is introduced through hydrogen inlet 16 to react at anode 14. Oxygen is introduced at oxygen inlet 17 where it permeates wick 19 to reach the cathode. Wick 19 contacts the outer surface of cathode 13 and, as stated above, is located between cathode 13 and the oxygen inlet. The water which is formed on cathode 13 and absorbed by wick 19 is removed from the fuel cell through water outlet 18.

The novel microporous sheet of the present invention also particularly useful as a separator in electric storage batteries. Such battery separators are generally in the form of thin sheets that are fitted between the electrodes of the battery in order to maintain the plates in proper spaced relation to prevent adjacent plates from touching and thereby causing short circuits, while at the same time permitting a circulation of the electrolytic medium. The porosity of the sheet permits ready passage of the electrolytic medium, which is commonly sulfuric acid, but at the same time prevents the passage of particles of solid matter from entering or passing through the pores. The hydrophilic nature of the silica provides for ready penetration of the acid electrolyte through the pores.

The novel sheets of the present invention may be provided with ribs of the type known to the art when used as battery separators.

The novel microporous sheet of Example 1 when used as a battery separator exhibited the following properties:

Thickness=20–30 mils
Mullen Burst Test=0.75 p.s.i./mil
SAE Life Cycle Test=No. of cycles to failure 355 to 360 (60 A.H. Battery 275 cycles specification)
Electrical resistance:
   After 20 min. soak in electrolyte=30 milliohms-in.$^2$
   After 30 min. soak in electrolyte while under vacuum of 27½ in. of mercury=11–15 milliohms-in.$^2$.

Corrosion Resistance Test

A separator was placed between negative and positive electrodes having a surface area of 3 square inches and a weight of 1 kilogram and immersed in sulfuric acid (1.4 specific gravity). 9 amps of current was applied (current density of 3 amp./in.$^2$) and the time until failure was measured.

```
                                          Time to failure, hours
Cellulosic separator (control) _____ 40
Separator of Example 1 _____ 116
```

In the above-described extremely severe corrosion test the separator of the present invention was found to last nearly three times as long as the prior art cellulosic separator.

Since various changes and modifications may be made in the above products and process without departing from the spirit and scope of the invention herein involved, it is intended that all matter contained in the above description shall be interpreted as illustrative and not in a limiting sense.

What is claimed is:

1. In a gaseous fuel cell comprising an ion exchange membrane positioned between and in contact with an anode and a cathode, means for supplying a fuel gas to said anode and means for supplying a gaseous oxidant to said cathode, the improvement which comprises a microporous, permeable sheet in contact with the surface of said cathode most distant from said ion exchange membrane, said sheet comprising a vinyl chloride/acrylonitrile copolymer and a hydrophilic filler, whereby the water generated at said cathode is removed by said sheet.

2. A fuel cell as defined in claim 1 wherein said copolymer comprises 15 to 50 percent by weight acrylonitrile and 85 to 50 percent by weight vinyl chloride.

3. A fuel cell as defined in claim 1 wherein said vinyl chloride/acrylonitrile weight ratio is 60:40.

4. A fuel cell as defined in claim 1 wherein said filler is silica gel.

5. A fuel cell as defined in claim 1 wherein said filler is present in the ratio of 0.15 to 1.5 parts by weight per parts of copolymer.

References Cited

UNITED STATES PATENTS

| | | | |
|---|---|---|---|
| 2,329,322 | 9/1943 | Baty et al. | 264—49 |
| 2,653,987 | 9/1953 | Baty | 136—146 |
| 2,772,322 | 11/1956 | Witt et al. | 136—146 |
| 3,092,518 | 6/1963 | Cahoon et al. | 136—146 |
| 3,134,696 | 5/1964 | Douglas et al. | 136—86 |
| 3,172,784 | 3/1965 | Blackmer | 136—86 |
| 3,216,882 | 11/1965 | Feldt | 136—86 X |
| 3,297,484 | 1/1967 | Niedrach | 136—86 |

ALLEN B. CURTIS, *Primary Examiner.*

U.S. Cl. X.R.

264—49; 136—146